(12) United States Patent
LaPrade (10) Patent No.: US 8,910,965 B2
(45) Date of Patent: *Dec. 16, 2014

(54) TRAILER HITCH SYSTEMS AND METHODS

(76) Inventor: John Wasem LaPrade, Friday Harbor, WA (US)

( * ) Notice: Subject to any disclaimer, the term of this patent is extended or adjusted under 35 U.S.C. 154(b) by 57 days.

This patent is subject to a terminal disclaimer.

(21) Appl. No.: 13/400,556

(22) Filed: Feb. 20, 2012

(65) Prior Publication Data

US 2012/0211967 A1 Aug. 23, 2012

Related U.S. Application Data

(60) Provisional application No. 61/444,239, filed on Feb. 18, 2011, provisional application No. 61/632,896, filed on Feb. 1, 2012.

(51) Int. Cl.
*B60D 1/06* (2006.01)
*B60D 1/28* (2006.01)

(52) U.S. Cl.
CPC ........................................ *B60D 1/06* (2013.01)
USPC ........ 280/511; 280/441.2; 280/507; 280/509; 280/512

(58) Field of Classification Search
CPC .......... B60D 1/015; B60D 1/06; B60D 1/065; B62D 53/061; B62D 53/065
USPC ........ 280/417.1, 425.2, 434, 437, 441.2, 508, 280/509, 511, 512, 513, 507
See application file for complete search history.

(56) References Cited

U.S. PATENT DOCUMENTS

| 4,522,421 A | 6/1985 | Vance |
| 5,263,735 A | 11/1993 | Mann |
| 5,335,930 A | 8/1994 | Tighe |
| 5,382,109 A | 1/1995 | Nyman |
| 5,385,363 A | 1/1995 | Morey |
| 5,482,309 A | 1/1996 | Hollis |
| 6,250,650 B1 | 6/2001 | Douglas |

(Continued)

FOREIGN PATENT DOCUMENTS

SU 842258 6/1981

OTHER PUBLICATIONS

International Searching Authority, "PCT International Search Report", Jun. 15, 2012, 9 pages.

(Continued)

*Primary Examiner* — Joseph M Rocca
*Assistant Examiner* — Marc A Scharich
(74) *Attorney, Agent, or Firm* — Michael R. Schacht; Schacht Law Office, Inc.

(57) ABSTRACT

A hitch system comprises a housing, a hitch plate, and an actuator system. The housing is secured to a hitch post, and the housing defines a housing opening and a housing chamber. The hitch plate is rotatably attached to the housing, and the hitch plate defines a first ball opening. The actuator system displaces the hitch plate relative to the housing such that the hitch system operates in an unhitched configuration in which the first ball opening is aligned with the housing opening and a hitched configuration in which the first ball opening is not aligned with the housing opening. A ball portion is inserted into the housing chamber and removed from the housing chamber when the hitch system is in the unhitched configuration. The ball portion is substantially secured within the housing chamber when the hitch system is in the hitched configuration.

14 Claims, 12 Drawing Sheets

(56) References Cited

U.S. PATENT DOCUMENTS

| | | | |
|---|---|---|---|
| 6,264,229 B1 * | 7/2001 | Gill et al. | 280/441.2 |
| 6,464,241 B1 * | 10/2002 | Daniel | 280/512 |
| 6,588,790 B2 | 7/2003 | Hall | |
| 6,808,195 B2 * | 10/2004 | Smith | 280/417.1 |
| 6,880,368 B1 * | 4/2005 | Ulbrich et al. | 70/14 |
| 6,983,950 B2 | 1/2006 | McCoy et al. | |
| 7,378,013 B2 | 5/2008 | Sandler | |
| 7,390,008 B1 | 6/2008 | Hall | |
| 7,926,832 B1 | 4/2011 | Hall | |
| 8,235,411 B2 * | 8/2012 | Works et al. | 280/508 |
| 8,286,986 B2 * | 10/2012 | Drake et al. | 280/490.1 |
| 8,376,388 B2 * | 2/2013 | Graber et al. | 280/511 |
| 2003/0047908 A1 * | 3/2003 | Lara | 280/441.2 |
| 2012/0211966 A1 * | 8/2012 | Drake et al. | 280/507 |
| 2012/0306180 A1 * | 12/2012 | Ye | 280/512 |
| 2013/0334793 A1 * | 12/2013 | LaPrade | 280/511 |

OTHER PUBLICATIONS

JGW Enterprises, LLC, Gooseneck Easy Coupler/Making Life Easier, web.archive.org/web/20101222031000/http://www.gooseneckeasycoupler.com/, Dec. 2010, 3 pages.

Trailer Enterprises Brochure, RAM Gooseneck Coupler, Part Nos. SAC2516-I, SAC-BOLT 293900, SAC-Nut 293910, p. 1.

Trailer Enterprises Brochure, FULTON Gooseneck Coupler, Part No. GN 291500, p. 1.

Trailer Enterprises Brochure, T.E.M.-Co., Auto-Lock Couplers, Part Nos. SM2516NP, SM251628, LL2516ST, p. 1.

Trailer Enterprises Brochure, BULLDOG Gooseneck Couplers, Part Nos. HB2516NP, HBA2516, HBQ2516ADJ, HBQ2516TW, HBA2516-25K, HBA2516-30K, p. 2.

Trailer Enterprises Brochure, B&W Trailer Hitches The Defender Gooseneck Coupler, Part No. BW4250, Aug. 2010, p. 2.

Trailer Enterprises Brochure, RAM Pacific Rim Gooseneck Couplers, Part Nos. GCPN25000, GCSQ25000, GCPN30000, p. 3.

Trailer Enterprises Brochure, ATWOOD, WALLACE FORGE Company Flat Mount Couplers, Part Nos. 75074, FMC251614, FC25, p. 3.

Trailer Enterprises Brochure, SAF HOLLAND, WALLACE FORGE Company Square Mount Draw Bars and Nose Plates, Part Nos. 1250-15, R49A, 1385, R51A, TNP71675, TNP716100, BLT716575, BLT716100, p. 3.

International Searching Authority, International Search Report PCT/US 2013/044532, Sep. 26, 2013, 7 pages.

* cited by examiner

TRAILER HITCH SYSTEMS AND METHODS

RELATED APPLICATIONS

This application U.S. patent application Ser. No. 13/400,556 filed on Feb. 20, 2012 claims priority of U.S. Provisional Patent Application Ser. No. 61/444,239 filed on Feb. 18, 2011.

This application also claims priority of U.S. Provisional Patent Application Ser. No. 61/632,896 filed on Feb. 1, 2012.

The contents of all related applications listed above are incorporated herein by reference.

TECHNICAL FIELD

The present invention relates to trailer hitch systems and, more specifically, to trailer hitch systems that can be remotely actuated.

BACKGROUND

A common hitch system for connecting a trailer to a vehicle such as a truck is referred to as a goose neck hitch. Goose neck systems typically employ a hitch system or coupler comprising a ball secured to the truck and a tube secured to the trailer. The tube supports a housing and lock plate that rotates relative to the housing. The ball is arranged within the housing with the lock plate in a first position, and the lock plate is rotated from first position to a second position such that a hole in the lock plate is misaligned with the housing. With the hole in the lock plate misaligned with the housing, the ball is prevented from being withdrawn from the housing, thereby securing the trailer to the truck.

Conventional goose neck hitch or coupler systems are manually operated, which requires the user to climb onto the truck bed and reach or crawl under the trailer to unlatch the lock plate and rotate the lock plate to hitch and unhitch the trailer. Manually unlatching the lock plate can be awkward for many users, and it is difficult to determine whether the trailer is securely latched to the truck.

The need exists for improved systems and methods for hitching trailers to vehicles such as trucks.

SUMMARY

The present invention may be embodied as a hitch system for coupling a hitch post to a ball portion. The hitch system comprises a housing, a hitch plate, and an actuator system. The housing is secured to the hitch post, and the housing defines a housing opening and a housing chamber. The hitch plate is rotatably attached to the housing, and the hitch plate defines a first ball opening. The actuator system displaces the hitch plate relative to the housing such that the hitch system operates in an unhitched configuration in which the first ball opening is aligned with the housing opening and a hitched configuration in which the first ball opening is not aligned with the housing opening. The ball portion is inserted into the housing chamber and removed from the housing chamber when the hitch system is in the unhitched configuration. The ball portion is substantially secured within the housing chamber when the hitch system is in the hitched configuration.

The present invention may also be embodied as a method of coupling a hitch post to a ball portion comprising the following steps. A housing defining a housing opening and a housing chamber is provided and secured to the hitch post. A hitch plate defining a first ball opening is provided and rotatably attached to the housing. An actuator for rotating the hitch plate relative to the housing is provided. The actuator is operated to displace the hitch plate in a first direction relative to the housing to place the hitch system in an unhitched configuration in which the first ball opening is aligned with the housing opening. The ball portion is inserted into and removed from the housing chamber when the hitch system is in the unhitched configuration. The actuator is operated to displace the hitch plate in a second direction relative to the housing to place the hitch system in a hitched configuration in which the first ball opening is not aligned with the housing opening. The ball portion is substantially secured within the housing chamber when the hitch system is in the hitched configuration.

The present invention may also be embodied as a hitch system for coupling a hitch post to a ball portion comprising a housing, a hitch plate, an actuator system. The housing is secured to the hitch post and defines a housing opening and a housing chamber. The hitch plate is rotatably attached to the housing and defines a first ball opening. The actuator system comprises an actuator supported by the housing, a first cam member supported by the actuator, and a second cam member secured to the hitch plate. Operation of the actuator causes the first cam member to engage the second cam member to rotate the hitch plate such that the hitch system is moved between a hitched configuration in which the first ball opening is not aligned with the housing opening and an unhitched configuration in which the first ball opening is aligned with the housing opening. The ball portion is inserted into the housing chamber and removed from the housing chamber when the hitch system is in the unhitched configuration. The ball portion is substantially secured within the housing chamber when the hitch system is in the hitched configuration.

DETAILED DESCRIPTION

Figure 1:
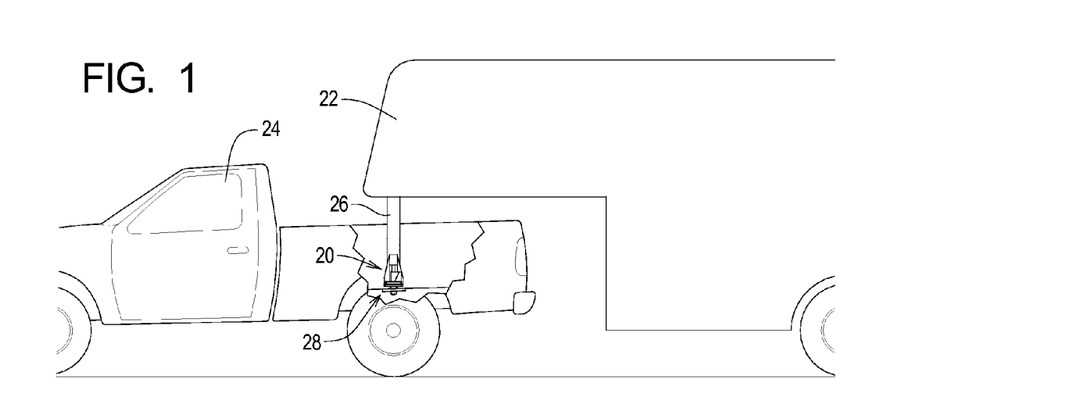
FIG. 1 is a perspective view of one possible environment illustrating the use a first example hitch system of the present invention.
Figure 2:
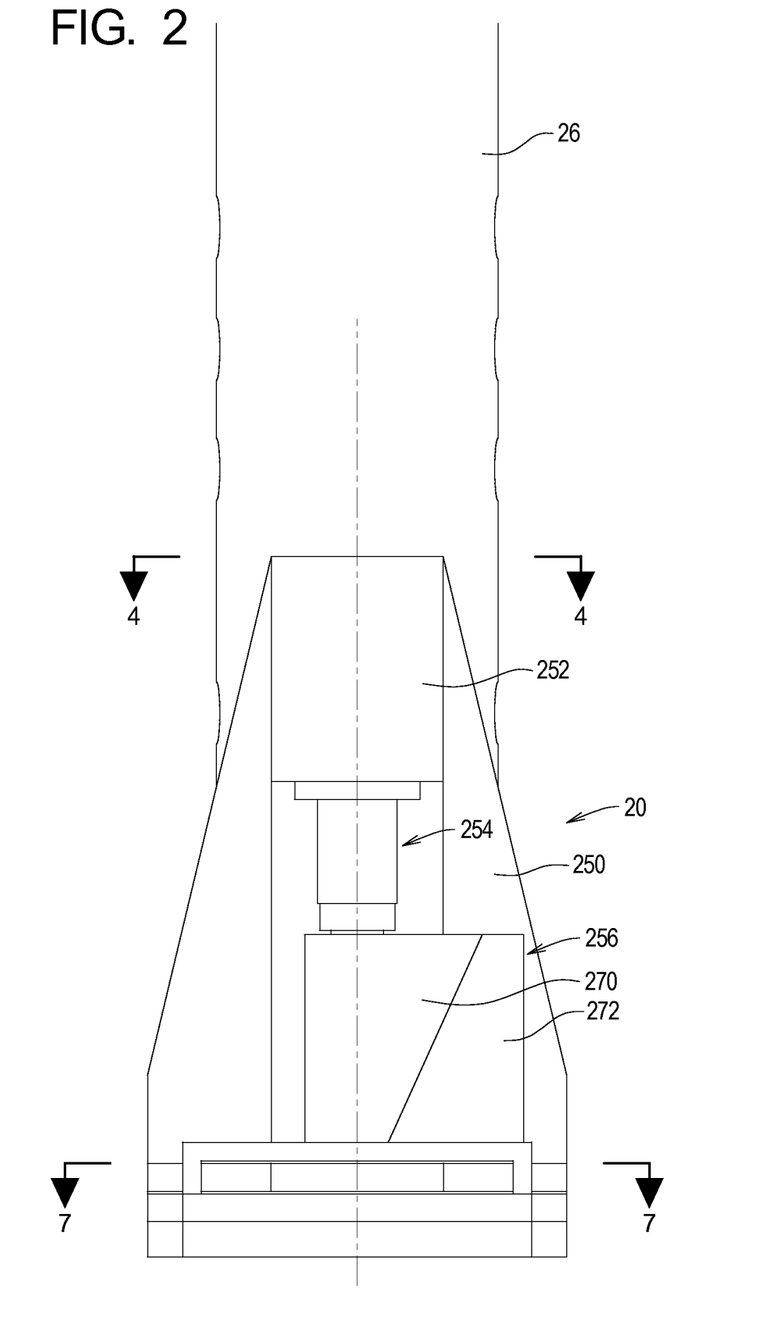
FIG. 2 is a left side elevation view of the first example hitch system.

Referring initially to FIG. 1 of the drawing, depicted at 20 therein is a first example hitch system adapted to connect a trailer 22 to a truck 24. In particular, the hitch system 20 is supported by a hitch post 26 connected to the trailer 22 to engage a ball assembly 28 (FIGS. 8 and 11) supported by the truck 24. The hitch post 26 and the ball assembly 28 are not per se part of the present invention, and examples of the hitch post 26 and the ball assembly 28 will be provided below simply to provide a complete understanding of the principles of the present invention.

Figure 8:
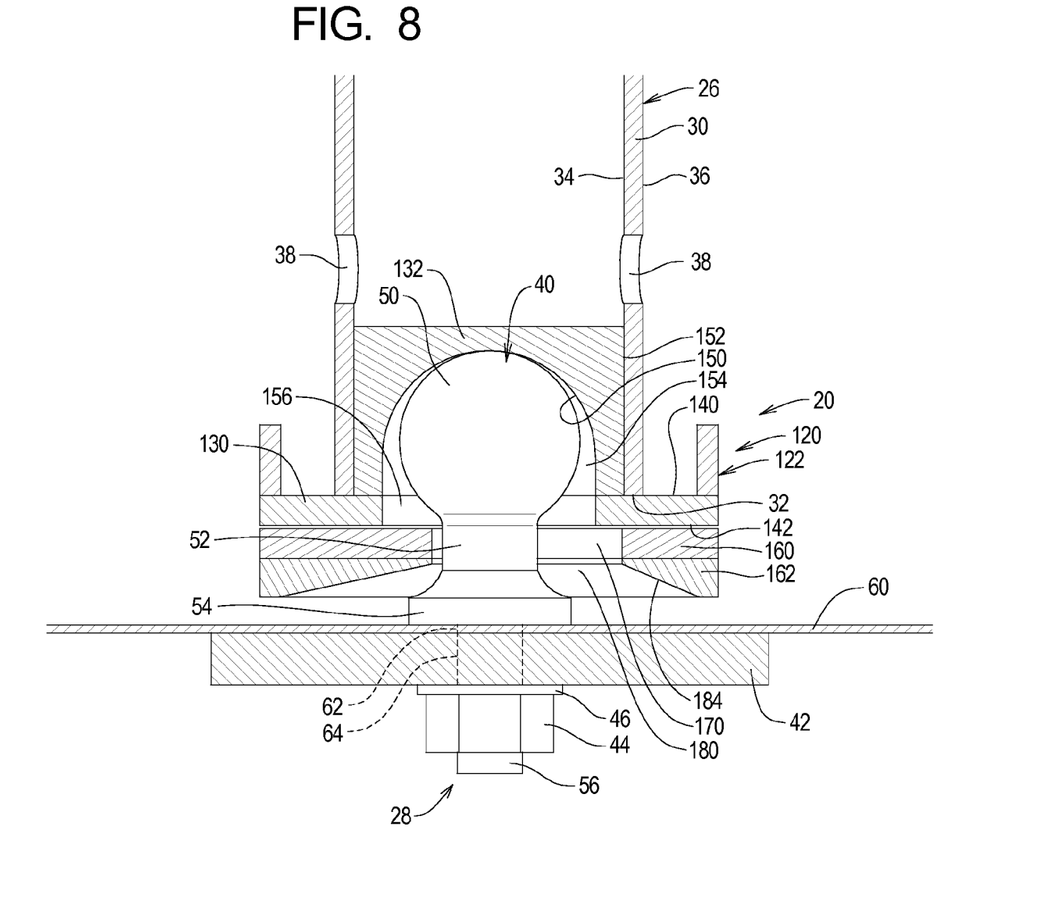
FIG. 8 is a section view taken along lines 8-8 in FIG. 3 showing the first example hitch system engaging a ball assembly in the locked configuration.

As perhaps best shown in FIG. 8, the example hitch post 26 defines a post wall 30 having a lower edge 32, an inner surface 34, and an outer surface 36. As may be conventional, post openings 38 are formed in the post wall 30. Other configurations of hitch posts other than the example hitch post 26 may be used in conjunction with a hitch system of the present invention.

FIG. 8 also shows that the example ball assembly 28 comprises a ball member 40, a ball plate 42, a ball nut 44, and a ball washer 46. The example ball member 40 comprises a ball portion 50, a neck portion 52, a base portion 54, and an anchor portion 56. FIG. 8 also shows that the truck 24 defines a bed wall 60 defining a bed wall opening 62 and that the ball plate 42 defines a ball plate opening 64. In use, the anchor portion 56 of the ball member 40 is passed through the bed wall opening 62 and the ball plate opening 64 such that the anchor portion 56 engages the bed wall 60. The ball nut 44 is engaged with the anchor portion 56 of the ball member 40 such that the ball nut 44 holds the ball washer against the ball plate 42, thereby securely clamping the ball member 40 relative to the truck 24 at a desired location. As with the hitch post 26 described above, other configurations of ball assemblies other than the example ball assembly 28 may be used in conjunction with a hitch system of the present invention.

Figure 3:
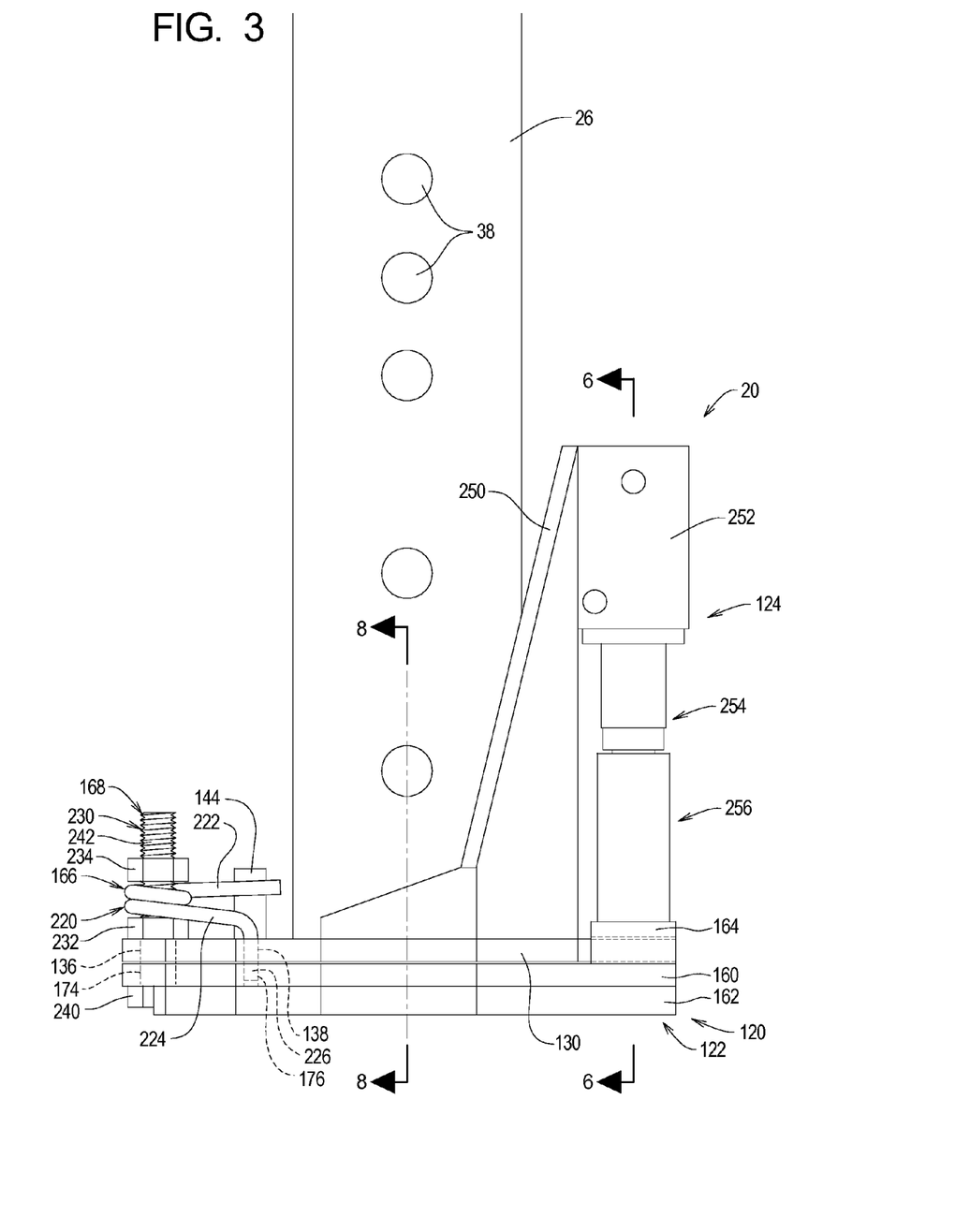
FIG. 3 is a front elevation view of the first example hitch system.

Turning now to the FIGS. 3 and 8, it can be seen that the first example hitch system 20 comprises a housing assembly 120, a hitch plate assembly 122, and an actuator assembly 124.

The housing assembly 120 comprises a housing plate 130 and a housing member 132. The housing plate defines a first lock opening 134, a first bolt member opening 136, and a spring member opening 138. The housing plate 130 further defines a housing plate upper surface 140 and a housing plate lower surface 142. A stop member 144 extends from the upper surface 140 of the example housing plate 130. The housing plate 130 further defines a lock projection 146 in which the first lock opening 134 is formed. The housing member defines a housing member inner surface 150 and a housing member outer surface 152. The housing member inner surface 150 defines a housing chamber 154, and the housing member 132 is rigidly connected to the housing plate upper surface 140 such that a housing opening 156 formed in the housing plate 130 is aligned with the housing chamber 154. Additionally, the housing member outer surface 152 is sized and dimensioned to conform to the post wall inner surface 34. The housing member 132 is thus inserted within the post wall 30 such that the post lower edge 32 comes into contact with the housing plate upper surface 140. The housing assembly 120 is rigidly connected to the hitch post 26.

Figures 4, 5:
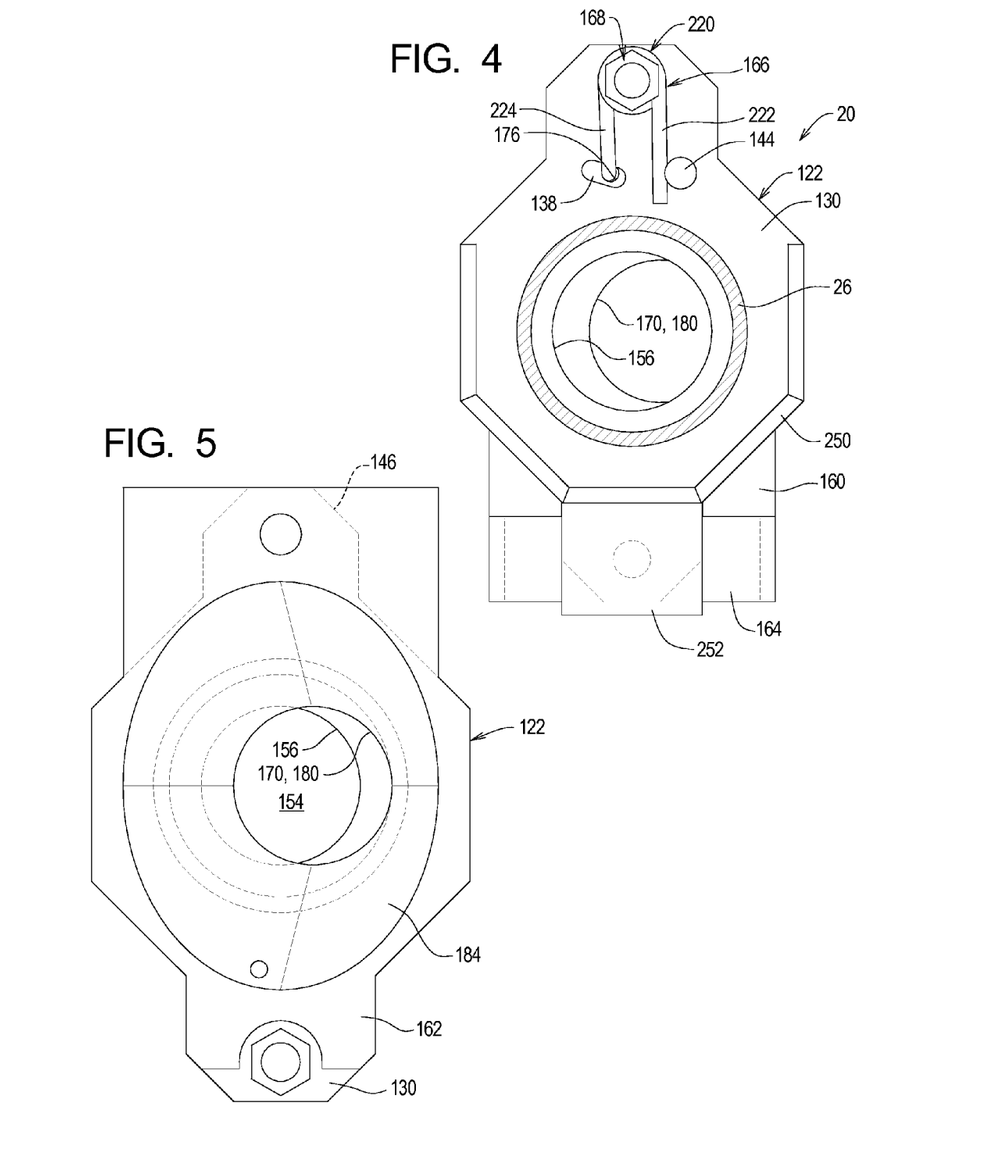
FIG. 4 is a section view taken along lines 4-4 in FIG. 2 showing the first example hitch system in a locked configuration.
FIG. 5 is a bottom plan view of the first example hitch system showing the first example hitch system in the locked configuration.
Figure 6:
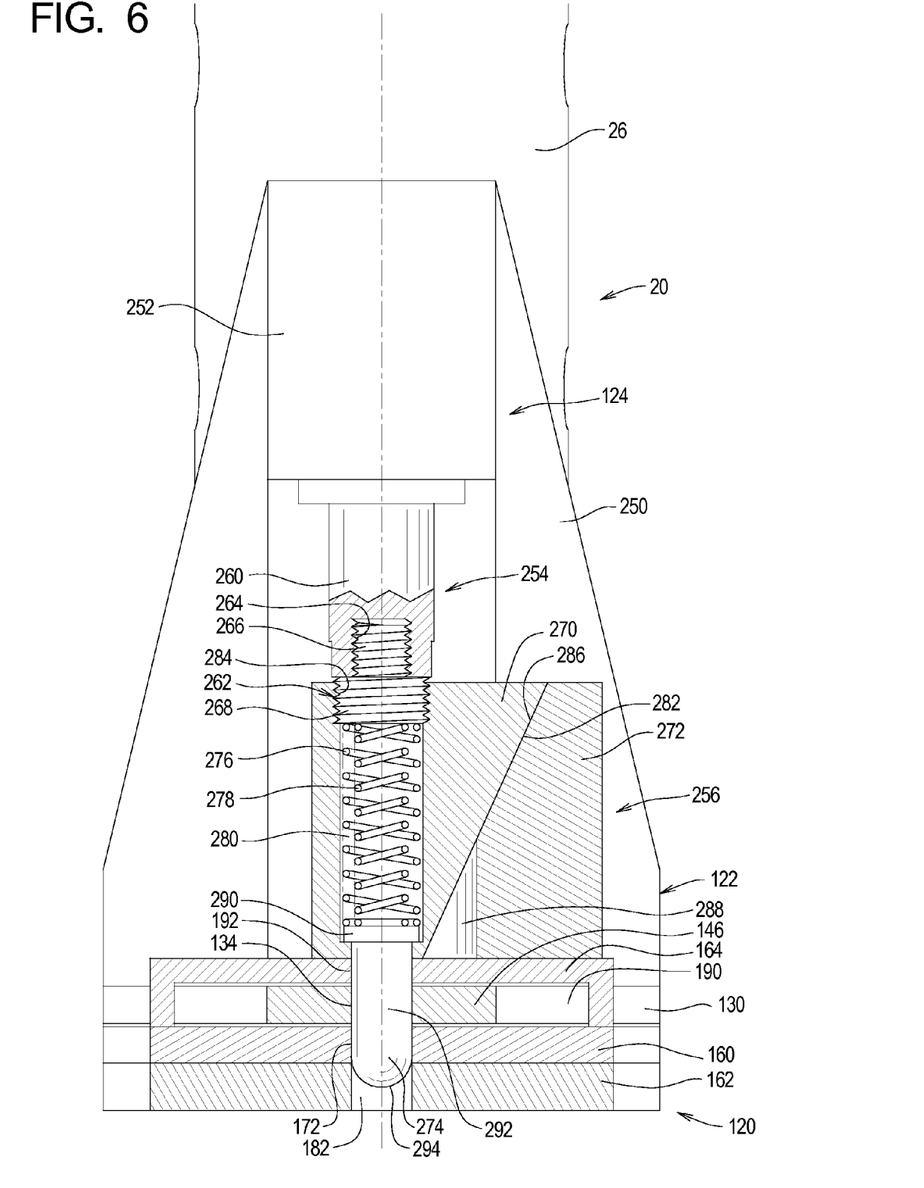
FIG. 6 is a section view taken along lines 6-6 in FIG. 3 showing the first example hitch system in the locked configuration.
Figure 7:
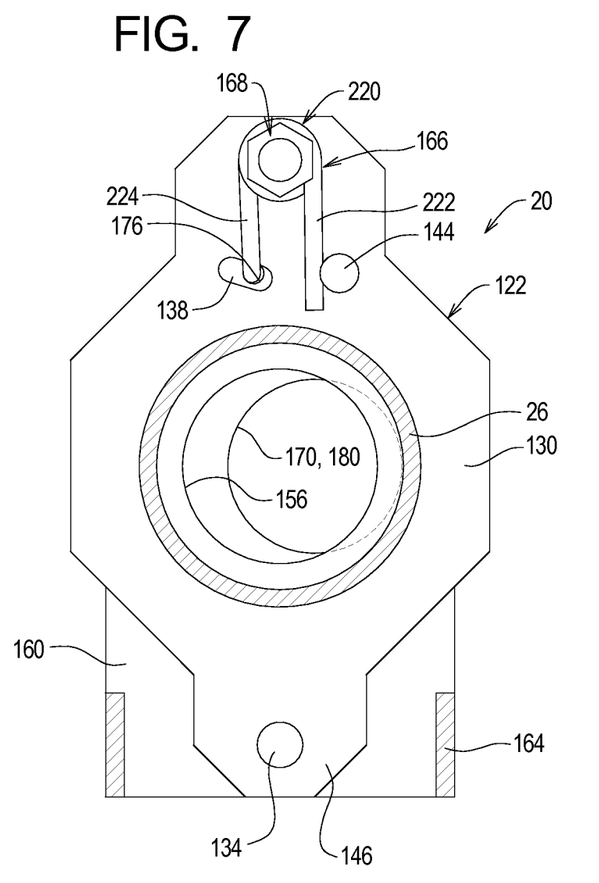
FIG. 7 is a section view taken along lines 7-7 in FIG. 2 showing the first example hitch system in the locked configuration.
Figure 9:
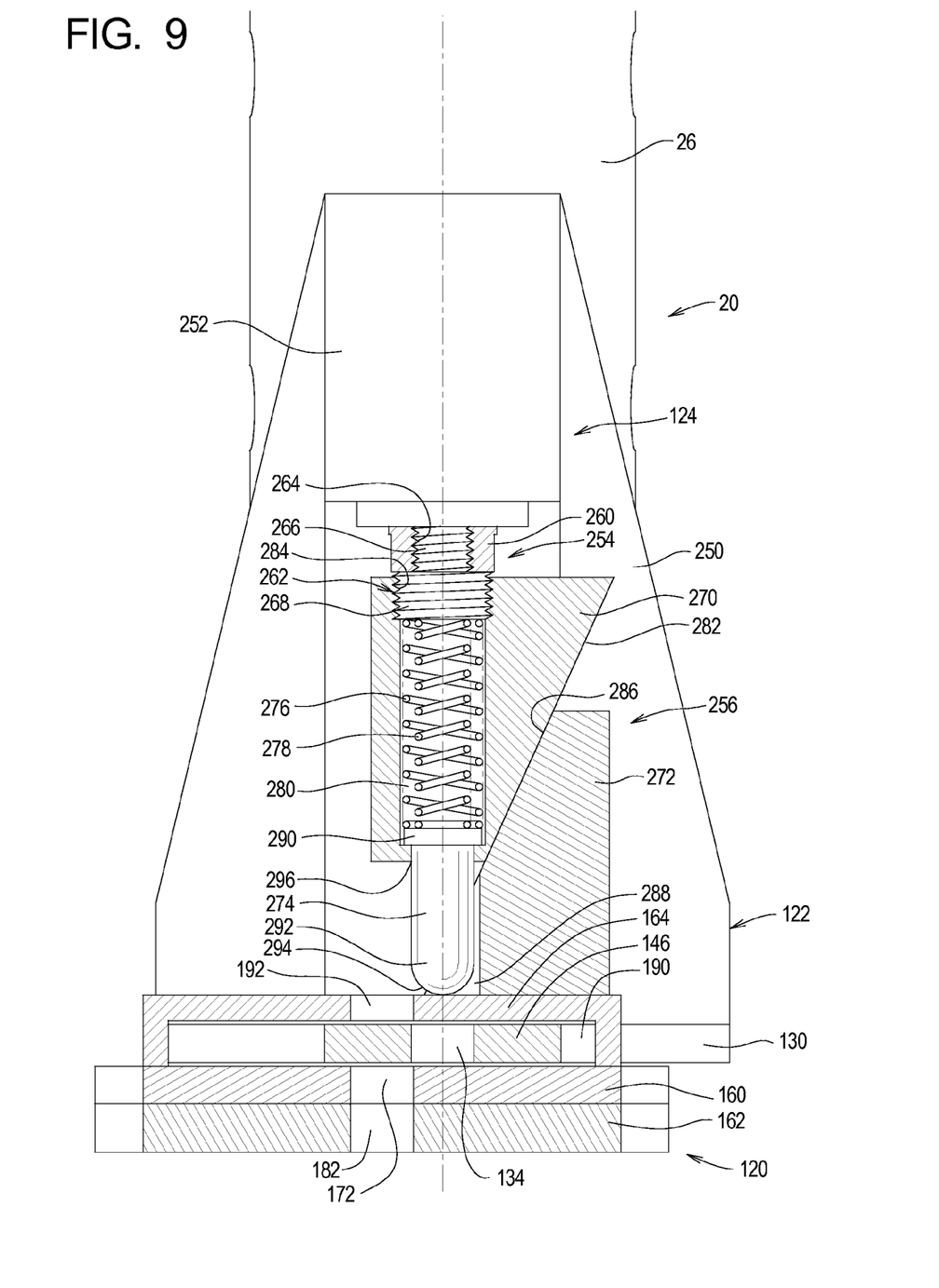
FIG. 9 is a section view similar to FIG. 6 showing the first example hitch system in an unlocked configuration.

FIG. 8 also shows that the example hitch plate assembly 122 comprises a hitch plate 160 and a guide plate 162. FIGS. 6 and 9 illustrate that the example hitch plate assembly 122 comprises a lock bracket 164. And FIG. 3 illustrates that the hitch plate assembly 122 further comprises a spring member 166 and a bolt assembly 168. FIG. 8 shows that the example hitch plate 160 defines a first ball opening 170, FIGS. 6 and 9 illustrate that example hitch plate 160 defines a second lock opening 172, and FIG. 3 illustrates that the example hitch plate 160 further defines a second bolt member opening 174 and a spring anchor opening 176. FIG. 8 also shows that the example guide plate 162 comprises a second ball opening 180, FIGS. 6 and 9 illustrate that the example guide plate 162 defines a third lock opening 182, and FIG. 5 illustrates that the example guide plate 162 defines a guide surface 184.

FIGS. 6 and 9 also illustrate that the example lock bracket 164 is a U-shaped member attached to an upper surface of the hitch plate 160 to define a lock gap 190. The example lock bracket 164 further defines a fourth lock opening 192. The example spring member 166 comprises a helical portion 220, a first arm portion 222, a second arm portion 224, and an anchor portion 226. The example bolt assembly 168 comprises a bolt member 230, a first nut 232, and a second nut 234. The bolt member 230 defines a head portion 240 and a threaded portion 242.

The example hitch plate assembly 122 is assembled as follows. The hitch plate 160 is arranged below and substantially coplanar with the housing plate lower surface 142. The bolt member 230 is inserted through the first bolt member opening 136 and the second bolt member opening 174 such that the bolt head portion 240 is in contact with the hitch plate 160. The first nut 232 is then engaged with the threaded portion 242 of the bolt member 230. The threaded portion 242 of the bolt member 230 is inserted into the helical portion 220 of the spring member 166 with: (a) the anchor portion 226 of the spring member 166 extending through the spring member opening 138 formed in the housing plate 130 and into the spring anchor opening 176 in the hitch plate 160; and (b) the first arm portion 222 of the spring member 166 engaging the stop member 144. The second nut 234 is then threaded onto the threaded portion 242 of the bolt member 230 to hold the spring member 166 on the bolt member 230.

Figure 10:
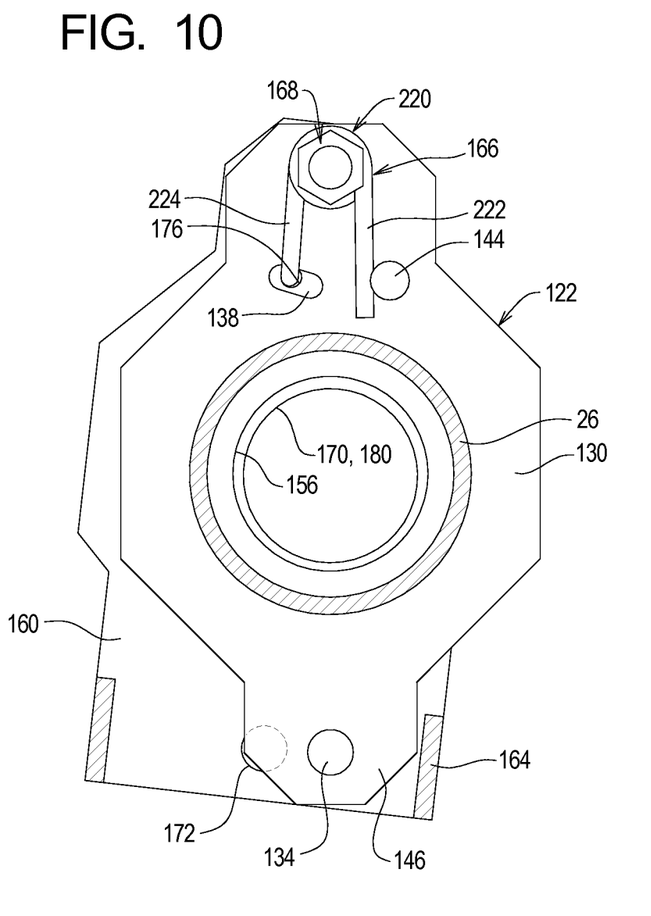
FIG. 10 is a section view similar to FIG. 7 showing the first example hitch system in the unlocked configuration.
Figure 11:
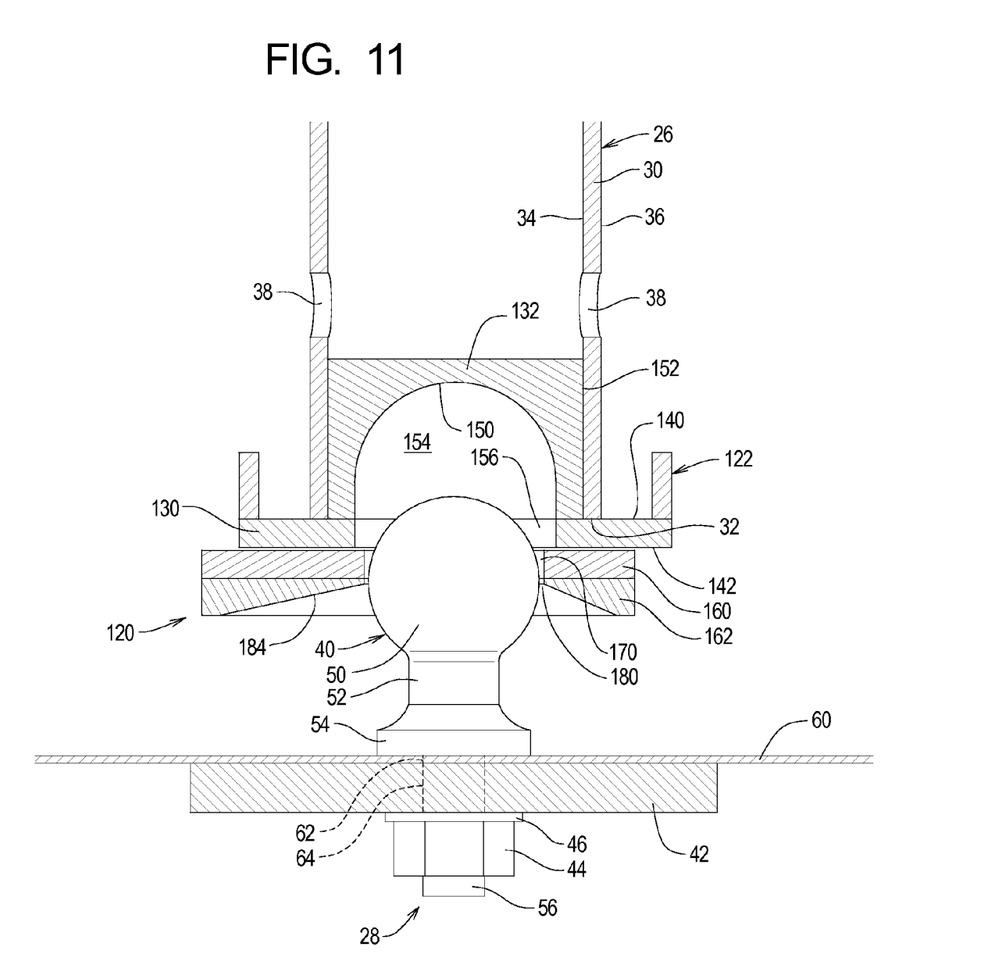
FIG. 11 is a section view similar to FIG. 8 showing the first example hitch assembly receiving the ball assembly in the unlocked configuration.

So assembled, the spring member 166 forms a torsion spring that biases the hitch plate 160 into an unhitched position relative to the housing assembly 120 (e.g., FIGS. 9-11). Alternatively, a tension spring may be configured to apply the biasing force on the hitch plate 160. By applying a locking force on the hitch plate 160, the hitch plate may be rotated or pivoted about a pivot axis defined by the bolt member 230 from the unhitched position into a hitched position relative to the housing assembly 120 (e.g., FIGS. 4-8).

Turning now to FIG. 3, it can be seen that the actuator assembly 124 comprises a stanchion 250, an actuator 252, a shaft assembly 254, and a cam assembly 256. The stanchion 250 is a rigid upright member or assembly capable of supporting the actuator 252, shaft assembly 254, and cam assembly 256 in a desired relationship as shown and described below.

The actuator 252 is or may be a conventional actuating system capable of linearly displacing the shaft assembly 254 using electrical energy directly or indirectly through a fluid medium such as hydraulics or pneumatics. The details of the example actuator 252 will thus not be described herein beyond what is necessary for a complete understanding of the present invention.

The shaft assembly 254 comprises a shaft member 260 and a coupler bolt 262. The shaft member 260 extends from the actuator 252 and defines a shaft threaded surface 264. The coupler bolt 262 defines first and second threaded portions 266 and 268. The first threaded portion 266 is sized and dimensioned to engage the shaft threaded surface 264.

The example cam assembly 256 comprises first and second cam members 270 and 272, a lock member 274, and a spring system comprising a first spring 276 and a second spring 278. The first cam member 270 defines a spring chamber 280, a first cam surface 282, and a cam threaded surface 284. The second threaded portion 268 of the coupler bolt 262 is sized and dimensioned to engage the cam threaded surface 284. The second cam member 272 defines a second cam surface 286 and a groove 288. The lock member 274 defines a flange portion 290, an engaging portion 292, and a tip portion 294.

The cam threaded surface 284 defines an upper portion of the spring chamber 280, and an engaging opening 296 is formed at a lower portion of the spring chamber 280. The lock member 274 is inserted into the spring chamber 280 through the upper portion defined by the cam threaded surface 284. The engaging portion 292 extends partly through the engaging opening 296, and the flange portion 290 prevents the lock member 274 from passing completely through the engaging opening 296. The example first and second spring members 276 and 278 are next inserted into the spring chamber 280 such that they are substantially coaxially aligned. The second threaded portion 268 of the coupler bolt 262 is engaged with the cam threaded surface 284 to secure the coupler bolt 262 to the first cam member 270. The coupler bolt 262 compresses the springs 276 and 278 such that the lock member 274 is biased into a locked position (FIG. 6) relative to the first cam member 270. In addition, the first threaded portion 266 of the coupler bolt 262 is engaged with the shaft threaded surface 264 to form the shaft assembly 254. At this point, the first cam member 270 is supported for movement relative to the actuator 252 along an actuator axis that extends through the actuator 252, shaft assembly 254, and the lock member 274.

The second cam member 272 is rigidly supported by the lock bracket 164 on the hitch plate 160 such that the first and second cam surfaces 282 and 286 are arranged at complementary angles with respect to the actuator axis. In addition, as generally described above the spring member 166 biases the hitch plate 160 relative to the housing plate 130. Accordingly, the biasing force applied to the hitch plate 160 relative to the housing plate 130 forces the second cam surface 286 towards the first cam surface 282 during normal operation of the hitch system 20.

During operation of the hitch system 20, the actuator 252 displaces the first cam member 270 between a retracted position (e.g., FIG. 9) and an extended position (e.g., FIG. 6). The example hitch system 20 is in the locked configuration when the first cam member 270 is in the extended position and in the unlocked configuration when the first cam member 270 is in the retracted position.

If the user is using the hitch system 20 to secure the trailer 22 to the truck 24, the user starts with the example hitch system 20 in the unlocked configuration (FIGS. 9 and 11). In particular, when the example hitch system 20 is in the unlocked configuration (FIGS. 9 and 11), the first and second ball openings 170 and 180 are aligned with the housing opening 156, and the ball portion 50 of the ball member 40 may freely pass through these openings 156, 170, and 180 and into and out of the housing chamber 154. Accordingly, to secure the trailer 22 to the truck 24, one or both of the trailer 22 and truck 24 are displaced until the ball portion 50 enters the housing chamber 154 with the hitch system 20 in the unlocked configuration.

The user then operates the actuator 252 to extend the shaft assembly 254 and thus displace the first cam member 270 along the actuator axis relative to the actuator 252. Because the stanchion 250 is fixed relative to the housing plate 130, the actuator axis is fixed relative to the housing plate 130. Accordingly, as the first cam member 270 moves along the actuator axis, the first cam surface 282 acts on the second cam surface 286, displacing the second cam member 272 away from the actuator axis. Because the second cam member 272 is fixed relative to the lock bracket 164 and thus the hitch plate 160, displacement of the second cam member 272 away from the actuator axis causes rotation or pivoting of the hitch plate 160 relative to the housing plate 130 such that the first and second ball openings 170 and 180 are no longer aligned with the housing opening 156.

Figure 12:
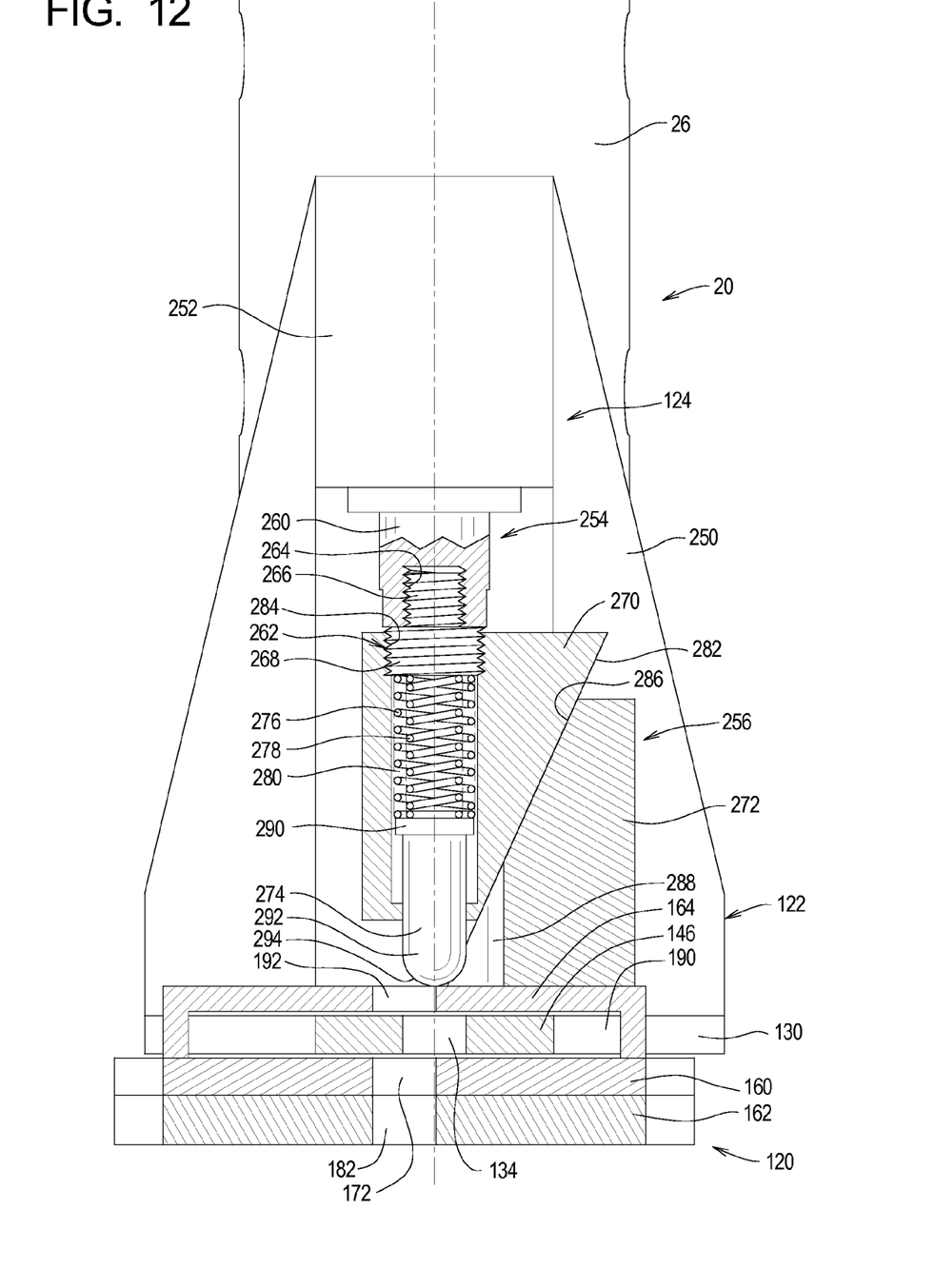
FIG. 12 is a section view similar to FIGS. 6 and 9 showing the first example hitch system in an intermediate configuration between the locked and unlocked configurations.

To allow the downward movement of the first cam member 270 relative to the second cam member 272 before the first, second, third, and fourth lock openings 134, 172, 182, and 192 are aligned, the lock member 274 compresses the springs 276 and 278 as shown by a comparison of FIGS. 9 and 12. As these lock openings 134, 172, 182, and 192 begin to align, the curved tip portion 294 of the lock member 274 begins to enter the fourth lock opening 192. When the lock openings 134, 172, 182, and 192 are completely aligned with the actuator axis, the springs 276 and 278 immediately force the lock member 274 along the actuator axis and through the lock openings 134, 172, 182, and 192 as shown in FIG. 6. At this point, as perhaps best shown in FIGS. 4, 5, and 8, the first and second ball openings 170 and 180 are fully misaligned with the housing opening 156. The distance between the closest portions of the openings 170 and 180 and the opening 156 is shorter than the diameter of the ball portion 50 of the ball member 40. The misalignment of the openings 170, 180 with the opening 156 thus prevents passage of the ball portion 50 of the ball member 40 out of the housing chamber 154. The hitch system 20 is now in its hitched configuration, and the trailer 22 is securely hitched to the truck 24.

To place the hitch system 20 from the hitched configuration into the unhitched configuration, the actuator 252 is operated to retract the shaft assembly 254 and thus move the first cam member 270 along the actuator axis relative to the second cam member 272. Until the lock member 274 exits the first lock opening 134, the first cam member 270 moves relative to the lock member 274 by compressing the springs 276 and 278. And until the lock member 274 exits the first lock opening 134, the first cam member 270 moves up, but the hitch plate 160 and thus the second cam member 272 are prevented from rotating or pivoting about the pivot axis, allowing a small gap to develop between the first and second cam surfaces 282 and 286. Once the lock member 274 clears the first lock opening 134, the hitch plate 160 rotates about the pivot axis relative to the housing plate 130 until the first and second cam surfaces 282 and 286 come into contact with each other (see, e.g., FIG. 12). Further retraction of the actuator 252 allows the hitch plate 160 to continue rotating relative to the housing plate 130 until the first and second ball openings 170 and 180 are aligned with the housing opening 156, at which point the hitch system 20 is in the unhitched configuration as show, for example, in FIGS. 9 and 11.

As perhaps best shown in FIGS. 5 and 11, the guide surface 184 defined by the guide plate 162 is angled towards the second ball opening 180 to guide the ball through the second ball opening 180 and thus eventually through the first ball opening 170 and the housing opening 156 and into the housing chamber 154. The example guide plate 162 is made of UHMW polyethylene material that is low in friction and replaceable when worn, but other materials having a desired combination of coefficient of friction and wear resistance may be used instead of UHMW. A retainer may be used to secure the guide plate 162 to the hitch plate 160.

Figure 13A:
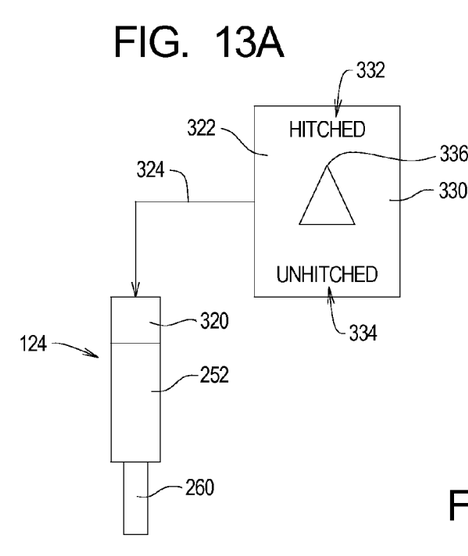
FIGS. 13A and 13B are schematic views of a control system for operating an actuator of the first example hitch assembly in hitched and unhitched configurations.
Figure 13B:
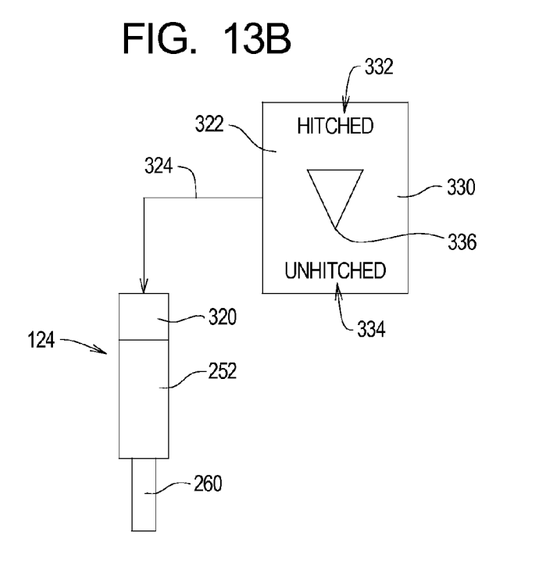

Referring now to FIGS. 13A and 13B, depicted therein are the actuator 252 and shaft member 260 of the actuator assembly 124. FIGS. 13A and 13B further illustrate that the actuator assembly 124 will typically comprise a motor 320 and may comprise a controller 322 operatively connected to the motor 320 by a communications system 324. As generally described above, the motor 320 may directly displace the shaft member 260 or may indirectly displace the shaft member 260 using a pump, working fluids, and/or conduit. In an all electric version, the motor 320 will take the form of a linear actuator. In a hydraulic system, the motor 320 will take the form of a pump. In a pneumatic system, the motor 320 will take the form of a compressor, storage tank, and valve.

The example motor 320 is operated based the orientation of a control switch 330 relative to first and second indicia 332 and 334 on the controller 322. In particular, an indicator 336 of the control switch 330 may point to the first indicia 332 to place the hitch system 20 in the hitched configuration and to the second indicia 334 to place the hitch system 20 in the unhitched configuration.

The controller 322 may be mounted on the motor 320, but, more conveniently, the controller 322 is remote from the motor 320. The communications system 324 may be any system for allowing a setting of the control switch 330 to be communicated to the motor 320. For example, the communications system 324 may incorporate a wire for transmitting electrical control signals between the controller 322 and the motor 320. Alternatively, the communications system 324 may employ wireless technology to allow the transmission of control signals between the controller 322 and the motor 320.

Further, the communications system 324 may allow bidirectional data communication between the hitch system 20 and the controller 322. In this case, sensors may be included in the hitch system as appropriate to detect faults, locations, status, and the like. In this case, the controller 324 may be provided with lights, a display, sound generation, or other means for communicating to the user the data generated by such sensors.

Additionally, governmental regulations often require that, in addition to using the hitch assembly 20 to connect the trailer 22 to the truck 24, a chain assembly be connected between the trailer 22 and the truck 24. To allow the example hitch system 20 to be formed, including connection of the chain assembly, from outside of the bed of the truck, the chain assembly may be arranged as follows. The chain assembly comprises first and second lengths of chain, each length having first and second clips formed on opposite ends. The clip on one end of each chain is connected to a D-ring securely mounted to the truck, typically adjacent to the ball member 40. The clips on the other end of each chain are connected to eye bolts or other structures securely attached to the structural frame of the trailer adjacent to the side edges of the trailer. The clips on the chains may be connected to these eye bolts without climbing into the truck bed under the trailer. When not attached to the eye bolts (e.g., when the trailer is disconnected from the truck), the clips may be attached to the side of the truck bed for easy access when they are next to be reattached to the eye bolts.

What is claimed is:

1. A hitch system for coupling a hitch post to a ball portion comprising:
   a housing secured to the hitch post, the housing defining a housing ball opening, a housing chamber, and at least one housing lock opening;
   a hitch plate attached to the housing, the hitch plate defining a hitch plate ball opening and at least one hitch plate lock opening, the hitch plate being supported for rotation relative to the housing between
      an unhitched configuration in which the hitch plate ball opening is aligned with the housing ball opening,
      a hitched configuration in which the hitch plate ball opening is not aligned with the housing ball opening;
   an actuator system for displacing the hitch plate relative to the housing, the actuator system comprising
      an actuator supported by the housing, the actuator defining an actuator axis,
      a first cam member defining a first cam surface and a lock cavity, the first cam member being rigidly secured to the actuator for movement along the actuator axis,
      a lock member supported at least partly within the lock cavity for movement relative to the first cam member along the actuator axis, and
      a second cam member defining a second cam surface and rigidly secured to the hitch plate; wherein
   operation of the actuator to displace the first cam member in a first direction along the actuator axis causes
      the first cam surface of the first cam member to engage the second cam surface of the second cam member to rotate the hitch plate from the unhitched configuration to the hitched configuration, and
      when the hitch system is in the hitched configuration, the lock member extends at least partly within the at least one housing lock opening and the at least one hitch plate lock opening, thereby preventing further rotation of the hitch plate relative to the housing; wherein
   operation of the actuator to displace the first cam member in a second direction along the actuator axis withdraws the lock member from the at least one housing lock opening and the at least one hitch plate lock opening, thereby allowing the hitch plate to rotate from the hitched configuration to the unhitched configuration; wherein
   the ball portion is insertable and removable from the housing chamber when the hitch system is in the unhitched configuration; and
   the ball portion is substantially secured within the housing chamber when the hitch system is in the hitched configuration.

2. The hitch system as recited in claim 1, in which the actuator system further comprises at least one lock spring member, wherein:
   the first cam member supports the lock member for movement between first and second positions; and
   the at least one lock spring member biases the lock member into the second position.

3. The hitch system as recited in claim 1, in which the actuator system further comprises a remote controller.

4. The hitch system as recited in claim 3, in which the actuator system further comprises a wireless communications system for allowing the remote controller to control the actuator system.

5. The hitch system as recited in claim 1, further comprising at least one lock spring where the at least one lock spring configured to force the lock member through the at least one housing lock opening and he at least one hitch plate lock opening when the hitch system is in the hitched configuration.

6. The hitch system as recited in claim 5, in which:
   the at least one lock spring is arranged at least partly within the lock cavity.

7. The hitch system as recited in claim 1, further comprising a main spring operatively connected between the housing and the hitch slate where the main spring acts on the hitch ate to bias the hitch system into the unhitched configuration.

8. The hitch system as recited in claim 1, further comprising a guide plate secured to the hitch plate, in which the guide plate defines:
   a guide plate ball opening that is aligned with the hitch plate ball opening; and
   a guide surface that is angled towards the guide plate ball opening; wherein
   when the ball portion comes into contact with the guide surface, the guide surface causes movement of the guide plate ball opening relative to the ball portion to facilitate entry of the ball portion into the housing chamber.

9. A hitch system for coupling a hitch post to a ball portion comprising:
   a housing secured to the hitch post, the housing defining a housing ball opening, a housing chamber, and at least one housing lock opening;
   a hitch plate rotatably attached to the housing, the hitch plate defining a hitch plate ball opening and at least one hitch plate lock opening;
   an actuator system comprising
      an actuator supported by the housing,
      a first cam member defining a lock cavity, the first cam member being supported by the actuator for movement along an actuator axis,
      a lock member supported within the lock cavity for movement relative to the first cam member, and
      a second cam member rigidly secured to the hitch plate; wherein
   operation of the actuator to displace the first cam member in a first direction along the actuator axis causes the first cam member to engage the second cam member to rotate the hitch plate to change the hitch system from an unhitched configuration, in which the hitch plate ball opening is aligned with the housing ball opening, to a hitched configuration in which the hitch plate ball opening is not aligned with the housing ball opening, the lock member lying at least partly within the at least one housing lock opening and the at least one hitch plate lock opening when the hitch system is in the hitched configuration; wherein
   operation of the actuator to displace the first cam member in a second direction along the actuator axis removes the lock member from the at least one housing lock opening and the at least one hitch plate lock opening to allow the hitch system to be changed from the hitched configuration to the unhitched configuration; wherein
   the ball portion is insertable and removable from the housing chamber when the hitch system is in the unhitched configuration; and
   the ball portion is substantially secured within the housing chamber when the hitch system is in the hitched configuration.

10. The hitch system as recited in claim 9, in which the actuator system further comprises a remote controller.

11. The hitch system as recited in claim 10, in which the actuator system further comprises a wireless communications system for allowing the remote controller to control the actuator system.

12. The hitch system as recited in claim 9, further comprising at least one lock spring, where:
   the lock member is supported by the first cam member for movement between first and second positions; and
   the at least one lock spring is configured to bias the lock member into the second position; whereby
   the at least one lock spring causes the lock member to extend through the at least one housing lock opening and the at least one hitch plate lock opening when the hitch system is in the hitched configuration; and
   the actuator removes the lock member from at least the at least one hitch plate lock opening when the hitch system is in the unhitched configuration.

13. The hitch system as recited in claim 9, further comprising a main spring member for acting on the hitch plate to bias the hitch system into the unhitched configuration.

14. The hitch system as recited in claim 9, further comprising a guide plate secured to the hitch plate, in which the guide plate defines:
   a guide plate ball opening that is aligned with the hitch plate ball opening; and
   a guide surface that is angled towards the guide plate ball opening; wherein
   when the ball portion comes into contact with the guide surface, the guide surface causes movement of the guide plate ball opening relative to the ball portion to facilitate entry of the ball portion into the housing chamber.

\* \* \* \* \*